United States Patent [19]

Chadwick

[11] Patent Number: 4,488,709
[45] Date of Patent: Dec. 18, 1984

[54] JACKING DEVICE FOR ARTICULATED STREETCAR

[75] Inventor: Dennis P. Chadwick, Napanee, Canada

[73] Assignee: Urban Transportation Development Corporation Ltd., Toronto, Canada

[21] Appl. No.: 395,112

[22] Filed: Jul. 6, 1982

[51] Int. Cl.³ .............................................. B66F 7/26
[52] U.S. Cl. .................................................... 254/423
[58] Field of Search ................ 254/420, 421, 423, 45, 254/93 R, 133; 104/273, 262, 263; 105/177; 92/128

[56] References Cited

U.S. PATENT DOCUMENTS

| | | |
|---|---|---|
| 193,211 | 7/1877 | Barnes .............................. 104/263 |
| 983,983 | 2/1911 | Derosa . |
| 1,026,337 | 5/1912 | Wolfson . |
| 1,062,871 | 5/1913 | Aaron . |
| 1,559,910 | 11/1925 | Peterson ........................ 254/133 R |
| 1,927,300 | 9/1933 | Schmeling .......................... 254/423 |
| 3,086,752 | 4/1963 | Wetter ................................ 254/420 |
| 3,103,182 | 9/1963 | Plasser et al. . |
| 3,275,298 | 9/1966 | Hand .................................... 254/45 |
| 3,345,037 | 10/1967 | Sweetland ......................... 254/420 |
| 3,362,351 | 1/1968 | Robertson . |
| 3,549,125 | 12/1970 | Hamilton .......................... 254/423 |
| 3,640,503 | 2/1972 | Spannlang . |
| 3,685,800 | 8/1972 | Schock .............................. 254/133 |
| 3,709,467 | 1/1973 | Mann .................................... 254/45 |
| 3,826,201 | 7/1974 | Stewart et al. . |
| 3,828,689 | 8/1974 | Raffenberg . |
| 4,090,453 | 5/1978 | Ali et al. . |

Primary Examiner—Robert C. Watson
Attorney, Agent, or Firm—Norbert P. Holler

[57] ABSTRACT

A jacking device for an articulated vehicle includes a support member secured to the vehicle and a jacking member slidable relative to the support member to lift the vehicle. A motor is detachably secured to the support member through a reaction member to cause relative movement between the jacking member and the support member. The motor and reaction member may be removed when not in use to allow storage at a remote location.

16 Claims, 5 Drawing Figures

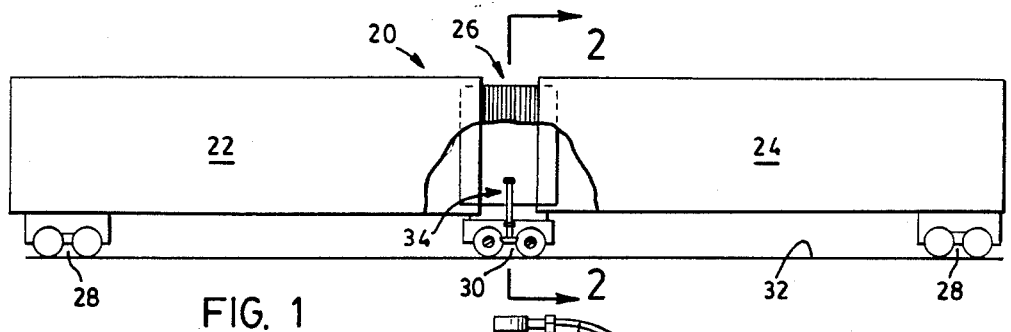
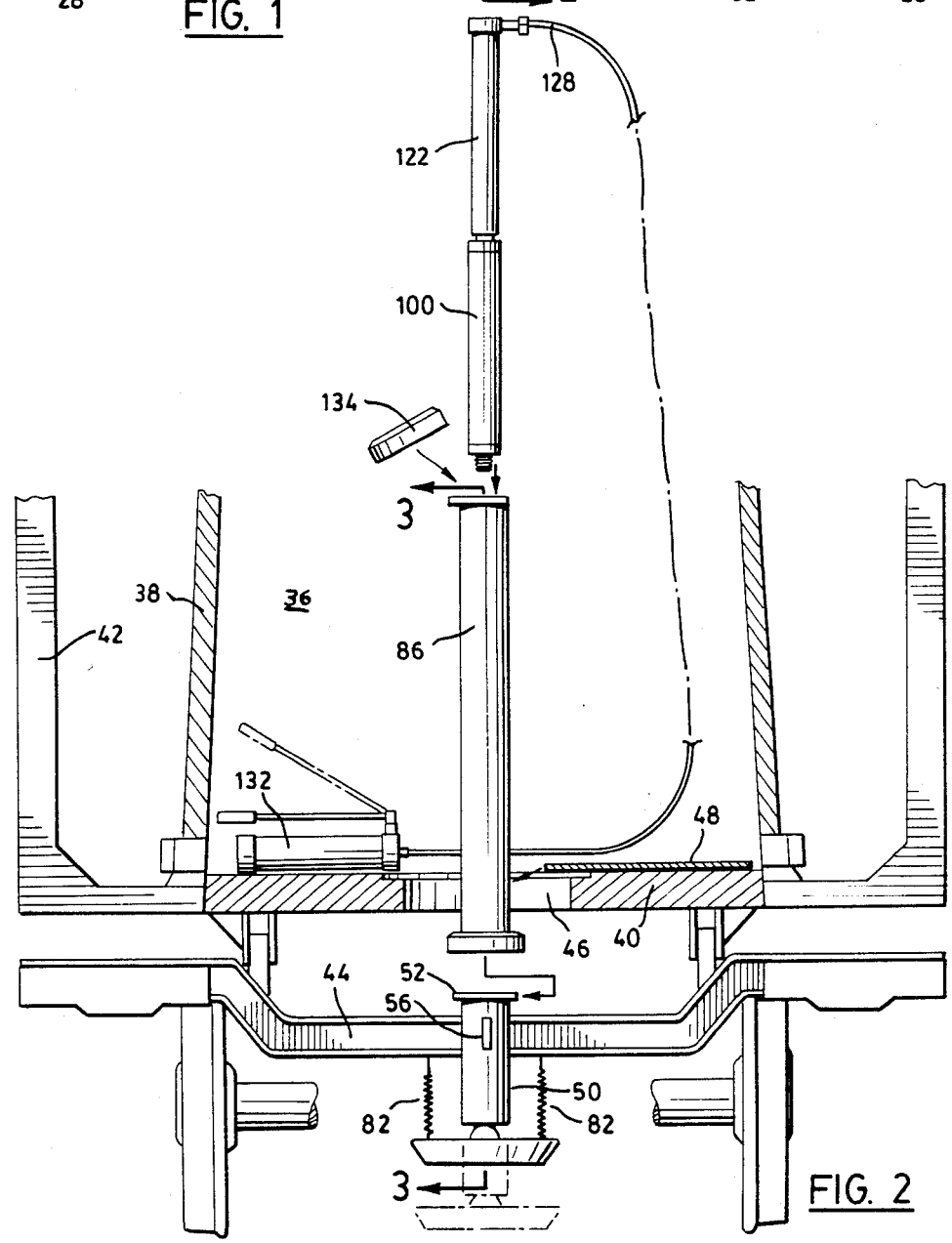

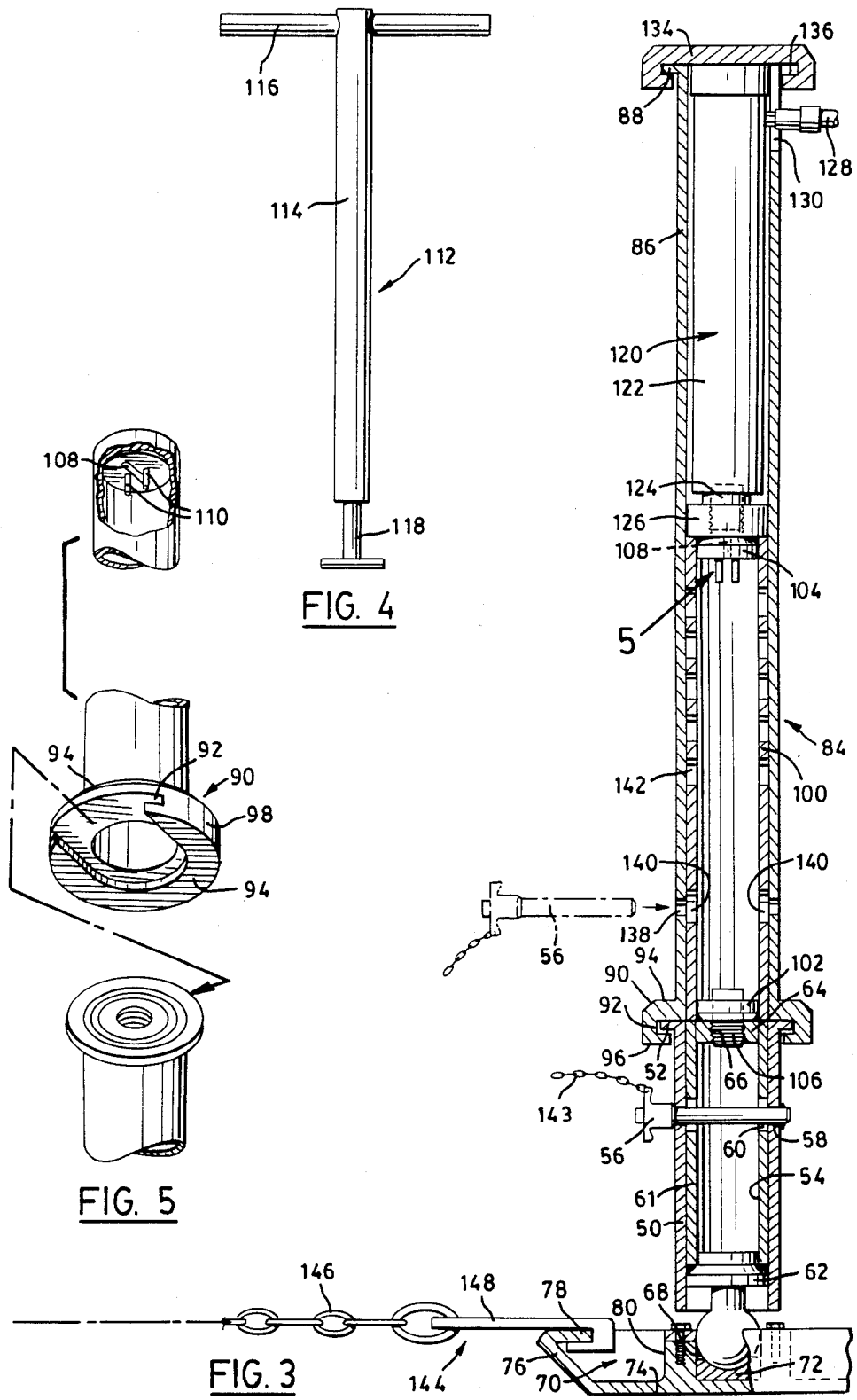

JACKING DEVICE FOR ARTICULATED STREETCAR

The present invention relates to jacks and in particular to jacks for articulated vehicles.

The use of an articulated chassis on vehicles to increase the overall length of the vehicle whilst maintaining the ability to negotiate curves is of course well known. Such vehicles may be supported on wheels disposed on opposite sides of an articulation joint, in which case the joint is designed to withstand relative movement about a horizontal transverse axis between the two parts of the vehicle, or may utilise three wheel assemblies, one disposed at either end of the vehicle and one beneath the articulation joint, to permit horizontal pivotal movement between the two parts of the vehicle. This latter arrangement is typically used on longer vehicles such as articulated streetcars to reduce the structural strength required in the chassis and to allow the vehicle to conform closely with the vertical curves that the vehicle negotiates. When the latter design is used on railed vehicles such as streetcars it is necessary to make provision for re-railing the streetcar in the event of a derailment. Derailments inevitably occur, particularly where streetcar tracks are integrated with the pavement and a simple yet effective means of re-railing the vehicle is desirable. When the leading or trailing axle of the vehicle is derailed it is a relatively straightforward matter to replace it by means of a lifting vehicle such as a tow truck positioned at the derailed end of the car. However, when the central axle assembly leaves the rails such lifting equipment cannot be used as access to both sides of the vehicle is not available unless a crane and sling arrangement is used. However, the use of such equipment is generally undesirable as they have to be used in the vicinity of overhead power transmission lines that create a hazard for the crane operator and also tend to cause congestion as they require a period of time to set up and operate. Similarly, where the derailment occurs in a confined area, access by a crane may not be practical.

It is therefore necessary to provide a jack that may be operated in a manner that facilitates replacement of the central axle assembly. However, such jacks must be convenient to use, must provide sufficient lift to allow the axle assemblies to be replaced on the rail and yet must be accommodated within the practical confines of a passenger vehicle without obstructing movement of passengers between the two halves of the vehicle.

It is therefore an object of the present invention to provide a jacking device which meets at least some of the criteria noted above.

According to the present invention there is provided a jacking device for a vehicle comprising a support member attached to said vehicle, a jacking member displaceable relative to said vehicle, motor means attachable to said support member and acting between said jacking member and said support member to cause relative displacement therebetween, said motor means being demountable from said support means for storage at a remote location.

An embodiment of the invention will now be described by way of example only with reference to the accompanying drawings in which:

FIG. 1 is a side view of an articulated streetcar.

FIG. 2 is a section on the line 2—2 of FIG. 1,

FIG. 3 is a view on the line 3—3 of FIG. 2 showing the jacking device of FIG. 2 in section, FIG. 4 is an elevation of an assembly tool used to assemble the device shown in FIG. 3, and FIG. 5 is a fragmentary detailed exploded view showing the assembly of the components of the device shown in FIG. 3.

Referring now to the drawings, an articulated streetcar generally designated 20 in FIG. 1 comprises two passenger carrying bodies 22-24 connected to one another by an articulation joint generally designated 26. The joint 26 accommodates relative rotation between the bodies 22-24 about a vertical axis and about a horizontal transverse axis to allow the vehicle to steer and to accommodate changes in grade. The details of the joint are not shown as they may be of any convenient form that is well known in the art.

The outboard ends of the bodies 22-24 are supported on axle assemblies 28 and the articulating joint 26 is supported on an axle assembly 30. Again details of these axle assemblies will not be shown as they may be of any convenient form well known in the art. The axle assemblies 28-30 are designed to run on a track 32 to guide the vehicle along the desired path. To facilitate replacement of the axle assembly 30 onto the track 32 in the event of a derailment a jacking system generally designated 34 is located within the joint 26.

As may best be seen in FIG. 2, the central joint 26 includes a passageway 36 that interconnects the interior of the two bodies 24-24. The passageway 36 has a pair of side panels 38 and a floor 40. The floor 40 is supported together with a bellows support frame 42 on a transverse bolster 44 that is supported by the axle assembly 30. An aperture 46 is formed in the floor 40 to permit access to the bolster 44 and is normally covered by means of hatch 48.

Supported on the bolster 44 on the centre line of the streetcar 20 is a support sleeve 50 having a radially extending lip 52 on the upper end thereof. As may be seen in FIG. 3a jacking member 54 is slidably received in the sleeve 50 and a pin 56 extends through aligned apertures 58-60 in the sleeve and jacking member 54 respectively to prevent relative movement between the sleeve and the jacking member.

The jacking member 54 is formed from a hollow cylinder 61 that is plugged at its lower end by ball member 62. The upper end of the jacking member 54 receives a collar 64 that has a central threaded hole 66 formed therein. The ball member 62 and collar 64 are welded to the respective ends of the cylinder 61 to form an integral unit with it.

The ball member 62 is received in a socket 68 formed in a shoe 70. A part spherical seat 72 receives the ball member 62 to allow limited pivotal movement between them about a horizontal axis and to permit rotation of the ball member 62 relative to the seat 72 about a vertical axis. This provides universal movement between the shoe 70 and the support sleeve 50. The shoe 70 is formed with a lower planar surface 74 and a peripheral skirt 76 that is upwardly inclined from the lower planar surface 74 and terminates in an inwardly directed horizontal lip 78. The socket 68 is formed in an upstanding protrusion 80 integrally formed with the lower planar surface 74. A pair of extension springs 82 extend between the bolster 44 and spaced locations of the shoe 70 to bias the shoe towards the bolster 44.

Relative displacement between the jacking member 54 and the support sleeve 50 is controlled by means of a detachable motor assembly 84. The motor assembly which may best be seen in FIG. 3 comprises a reaction member in the form of an outer tube 86 having a radially extending lip 88 at the upper end and a collar 90 at its lower end. The collar 90 is formed with a horizontal slot 92 between its upper and lower surfaces 94–96 and intersecting its circumferential surface 98. A portion of the lower surface 96 is removed to permit access to the slot 92. The portion of the lower surface 96 that is removed has a dimension corresponding to the diameter of the sleeve 50 and the width of the slot 92 is chosen to be slightly greater than the diameter of the lip 52. The tube 86 may therefore be connected to the support sleeve 50 by sliding the slot 92 onto the lip 52.

A spacer in the form of an inner tube 100 is slidably received within the outer tube 86 and is sealed at opposite ends by spigots 102–104. The spigot 102 is located at the lower end of the inner tube 100 and has a threaded protusion 106 projecting downwardly along the longitudinal axis of the inner tube 100. The threaded protusion 106 is received in the threaded hole 66 to connect the jacking member 54 to the inner tube 100. As may best be seen in FIG. 5 the spigot 104 has a diametrically extending slot 108 extending through it with a pair of downwardly projecting pins 110 located at the underside of the spigot 104 on either side of the slot 108. The slot 108 and pins 110 are provided to accommodate an assembly tool 112 shown in FIG. 4.

The assembly tool 112 includes a central shaft 114 with a handle 116 at one end. At the opposite end of the shaft 114 to the handle 116 is a T piece 118 that is dimensioned to pass through the slot 108 and into engagement with the pins 110. The length of the shaft 114 is chosen to reach from the upper end of the outer tube 86 to the spigot 104 to permit the T piece 118 to be inserted into the slot 108 and transmit rotation of the shaft 114 to the inner tube 100. This rotation causes the threaded protusion 106 to engage the threads of the hole 66 and connect the inner tube 100 with the jacking member 54.

A single acting hydraulic motor 120 is also received within the outer tube 86 and includes a cylinder 122 and a piston rod 124. The piston rod 124 is connected to a piston member (not shown) in the normal manner so that supply of fluid to the interior of the cylinder 122 causes extension of the piston rod 124. The projecting end of the piston rod 124 carries a cylindrical collar 126 that abuts the upper end of the inner tube 100. Fluid is supplied to the interior of the cylinder 122 through a conduit 128 that passes through a slot 130 extending from the upper end of the outer tube 86. Pressurised fluid is supplied to the conduit 128 from a hand pump 132 (FIG. 2) which is of conventional construction and includes a valve to direct flow to or from the conduit 128.

The motor 120 is retained within the outer tube by means of a cap 134 that has a horizontal slot 136 formed therein in a manner similar to that in the collar 90. The cap 134 may therefore be slid horizontally to engage the lip 88 at the upper end of the outer tube 86 and prevent relative vertical displacement between the cap 134 and the outer tube 86.

The outer tube 86 is formed with a diametrically extending bore 138 that in the position shown in FIG. 3 is aligned with a similar bore 140 provided in the inner tube 100. The inner tube 100 also carries a series of diametric bores 142 located at spaced intervals along the axis of the inner tube 100 to be brought into alignment with the bore 138. The pin 56 is tethered to the bolster by cable 143 which has sufficient length to enable the pin 56 to be inserted within the bore 138 and through an aligned one of the bores 140 or 142.

As illustrated in FIG. 3, a traction device 144 in the form of a chain 146 and a hook 148 is provided to engage the lip 78 on the shoe 70.

The operation of the jacking system 34 will now be described assuming that the system is in the condition shown in FIG. 2 with the central axle assembly 30 having left the rails of the track 32. The hand pump 132, assembly tool 112 and motor assembly 84 are stored in a location remote from the bolster 44 in any convenient tool location provided for a tool kit or similar devices. The components are retrieved and the hatch 48 removed from the floor 40 to gain access to the bolster 44 through the aperture 46. The outer tube 86 is initially slid in a horizontal direction over the lip 52 of sleeve 50 so that the lip 52 is received in the slot 92. The inner tube 100 is then slid into the outer tube from the upper end and the assembly tool 112 inserted into the slot 108 in the spigot 104. The assembly tool 112 is rotated by means of the handle 116 so that the threaded protrusion 106 engages the hole 66 and firmly connects the inner tube 100 to the jacking member 54. The handle 116 for assembly tool 112 enables sufficient torque to be applied to ensure that the sleeve 50 and inner tube 100 are in snug abutment with one another.

The assembly tool 112 may also be used to rotate the inner tube and sleeve within the outer tube 86 is the bores 138–140 are not in alignment. To do this it is of course necessary to remove the pin 56 but the weight of the shoe, sleeve and inner tube 100 is counterbalanced by the springs 82 to hold the jacking member 54 in a retracted position within the sleeve 50. With the bores 138–140 in alignment, the pin 56 may be inserted through the bores to retain the inner tube within the outer tube.

The motor 120 is then inserted from the upper end of the outer tube 86 so that the conduit 128 is received in the slot 130. The motor 120 is assembled in a fully retracted position, that is of minimum length and the conduit 128 is connected to the hand pump 132. It is convenient to maintain the connection between the conduit 128, the hand pump 132 and the motor 120 even when the components are in storage to avoid loss of hydraulic fluid from the hand pump 132. With the motor located within the outer tube 86, the cap 134 may be slid horizontally across the end of the outer tube to engage the lip 88. The pin 56 may then be removed and hydraulic fluid pumped from the hand pump 132 to the interior of the cylinder 122. This causes the piston rod to extend from the cylinder and move the jacking member 54 downwardly against the bias of the springs 82. The load exerted on the cylinder 122 is reacted by the end cap 134 and by the collar 90. Continued spring of fluid into the cylinder 122 brings the shoe 70 into engagement with the ground. Further extension of the motor 120 exerts a lifting force on the bolster 44 to raise the axle assembly 30 from the ground. When the axle assembly 30 has been lifted to the desired height the inner tube 100 may be locked to the outer tube 86 by means of the pin 56. The motor 120 is operated until one of the bores 142 is brought into alignment with the bore 138 and the pin 56 inserted. The pin 56 may also be used in the manner described above to enable increased lift to be obtained from the jacking device.

If the stroke of the motor 120 is insufficient to lift the axle assembly to the desired height, the pin 56 may be inserted between the bores 138-142 to support the inner tube 100 relative to the outer tube 86. The valve on the hand pump 132 can then be released to relieve pressure from the motor 120 and allow the end cap 134 to be removed. The motor 120 is then removed and a further tube similar to that of the inner tube 100 inserted within the outer tube 86. The motor is collapsed, inserted into the outer tube 100 and the end cap 134 replaced. The pressure is then supplied from the hand pump 132 to support the weight of the vehicle and the pin 56 removed to permit further extension of the jacking device.

Once the axle assembly has been lifted to the desired height it may be positioned by attaching the hook 148 to the lip 78 and pulling on the chain 146 in the appropriate direction. This can be achieved by means of a conventional truck or winch assembly and causes the shoe to skid along the surface and move the axle assembly and centre portion 26 back into alignment with the track 32. Obviously to enable skidding in this manner to occur it may be necessary to insert a plank of wood or a metal surface beneath the shoe before jacking occurs. However, on pavement it is believed that the undersurface of the shoe will permit skidding to be satisfactorily performed. It should also be noted that the hook 148 is attached to the shoe as close to the undersurface 74 as practical. This minimises the tendency for the support sleeve 50 to twist relative to the bolster and improves the stability of the jacking device during maneuvering.

Moreover, the axis of the jack is positioned close to the articulation axis of the vehicle which facilitates positioning of the truck over the track.

Once the axle assembly is positioned over the track, pressure is relieved from the motor 120 through the hand pump until the axle assembly 30 is once again resting on the track. The cap 134 may then be removed, the motor 120 extracted and the tool 112 used to remove the inner tube 100. The outer tube 86 may then be slid horizontally out of engagement with the lip 52 and the jacking member returned to a position in which the apertures 58-60 are aligned to receive the pin 56. The inner tube 100, outer tube 86 and motor 120 may then be replaced in their appropriate storage area and the hatch 48 replaced over the aperture 46.

It will be seen therefore that the jacking device provides a system in which lifting and manipulation of the central axle assembly of the streetcar may be achieved without resorting to large overhead cranes. Further, the detachment of the motor assembly that comprises the motor 120, inner tube 100 and outer tube 86 enables the jacking system to be accommodated below the floor line of the vehicle so that obstruction of the passageway between the vehicles does not occur.

The lifting height of the jacking device is also enhanced by the positive connection between the jacking member 54 and the inner tube 100 so that the stroke is not limited to the length of the sleeve 50. The provision of the threaded collar 64 and the threaded protusion 106 ensures that structural rigidity between the inner tube 100 and the jacking member 54 is achieved sufficient to support the central portion of the body in a stable manner.

Whilst the preferred embodiment utilises springs 82 to assist in return of the jacking member, these springs may if desired be eliminated and return of the jacking member achieved by manipulation of the tool 112.

Accordingly, it is believed that the jacking system described overcomes many of the disadvantages of the prior art systems and offers a practical system that meets normal operational requirements.

I claim:

1. A jacking device for a vehicle comprising a support member attached to said vehicle, a jacking member slidably supported by said support member and displaceable relative to said vehicle along a vertical axis, a reaction member detachably secured to said support member and extending therefrom in a vertical direction on opposite sides of said axis, motor means located on said axis within said reaction member and acting between said jacking member and said reaction member to cause relative displacement therebetween, said motor means and said reaction member being demountable from said jacking member and said support means respectively for storage at a remote location.

2. A jacking device according to claim 1 wherein said reaction member includes a tube attached at one end to said support member and connected to said motor means at its other end.

3. A jacking device according to claim 2 wherein said motor means is received within said tube and is connected to said other end of said tube by a cap that is detachably secured to said tube to cover said either end thereof.

4. A jacking device according to claim 2 wherein said reaction member is attachable to said support member by engaging a horizontal protusion on one of said members in a horizontal slot formed on the other of said members, said slot and protusion cooperating to prevent relative movement therebetween along a vertical axis.

5. A jacking device according to claim 4 wherein said protusion is formed by a flange secured to said support member and said horizontal slot is formed in a collar secured to one end of said reaction member.

6. A jacking device according to claim 3 wherein said cap is detachably secured to said tube by engaging a protusion on said tube with a horizontal slot in said cap to prevent relative movement therebetween on a vertical axis.

7. A jacking device according to claim 3 wherein a spacer is interposed between said motor means and said support member, said spacer being snugly received within said tube and slidable relative thereto.

8. A jacking device according to claim 7 wherein said tube includes a transverse bore intermediate the ends thereof and said spacer includes a plurality of transverse holes at spaced locations along its length, said bore and holes being alignable to receive a pin to lock said tube and spacer to one another and prevent relative movement between and support member and said jacking member.

9. A jacking device for a vehicle comprising a support member attached to said vehicle, a jacking member slidably supported by said support member for movement along a generally vertical axis, a reaction member extending from one end of said support member on both sides of said vertical axis and detachably connected to said support member for storage at a remote location, said reaction member supporting a motor on said vertical axis for extension therealong, said motor acting between said reaction member and said jacking member so that extension of said motor causes relative sliding movement between said support member and said jacking member.

10. A jacking device according to claim 9 wherein said reaction member is a tube connected at one end to said support member.

11. A jacking device according to claim 10 wherein said support member is a tube and said reaction member is detachably secured thereto by means of a horizontal slot in said reaction member cooperating with a radially extending flange on said support member, to prevent relative movement therebetween along said vertical axis.

12. A jacking device according to claim 11 wherein said motor is located within said tube and bears against an end cap detachably secured to said tube to transmit forces from said jacking member to said support member.

13. A jacking device according to claim 12 wherein a spacer is positioned in said tube between said jacking member and said motor, attachment means being provided to connect securely said spacer and said jacking member.

14. A jacking device for an articulated vehicle having an axle assembly located intermediate the ends of the vehicle beneath a passageway connecting opposite ends of the vehicle, said jacking device comprising a support member attached to said axle assembly and located beneath said passageway, a jacking member supported by said support member for movement relative thereto along a vertical axis, a reaction member detachably secured to said support member, and motor means to act between said reaction member and said jacking member to cause relative movement therebetween, said motor means and said reaction member projecting from said support member into said passageway and being detachable when not in use for storage in a remote location to permit unemcumbered movement through said passageway.

15. A jacking device according to claim 14 wherein said reaction member extends to both sides of said vertical axis and said motor is located on said axis to inhibit eccentric loading of said reaction member.

16. A jacking device according to claim 15 wherein said reaction member is a tube and said motor means is located within said tube.

* * * * *